United States Patent
Janitch

(10) Patent No.: US 10,451,468 B2
(45) Date of Patent: Oct. 22, 2019

(54) THROUGH AIR RADAR LEVEL TRANSMITTER WITH FLUSHING PORT

(71) Applicant: Magnetrol International, Incorporated, Aurora, IL (US)

(72) Inventor: Paul G. Janitch, Lisle, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 115 days.

(21) Appl. No.: 15/676,344

(22) Filed: Aug. 14, 2017

(65) Prior Publication Data

US 2018/0209834 A1  Jul. 26, 2018

Related U.S. Application Data

(60) Provisional application No. 62/449,647, filed on Jan. 24, 2017.

(51) Int. Cl.
| | |
|---|---|
| *G01F 23/284* | (2006.01) |
| *H01Q 1/22* | (2006.01) |
| *H01Q 13/06* | (2006.01) |
| *H01Q 19/08* | (2006.01) |
| *G08C 19/02* | (2006.01) |
| *B08B 3/08* | (2006.01) |

(Continued)

(52) U.S. Cl.
CPC .............. *G01F 23/284* (2013.01); *B08B 3/08* (2013.01); *B08B 5/02* (2013.01); *G01S 7/003* (2013.01); *G01S 13/10* (2013.01); *G01S 13/88* (2013.01); *G08C 19/02* (2013.01); *H01Q 1/22* (2013.01); *H01Q 1/225* (2013.01); *H01Q 13/06* (2013.01); *H01Q 19/08* (2013.01); *H02J 50/10* (2016.02); *H02J 50/80* (2016.02); *G01S 2007/027* (2013.01); *H01Q 13/02* (2013.01)

(58) Field of Classification Search
CPC ......... G01F 23/284; H02J 50/10; H02J 50/80; B08B 3/08

See application file for complete search history.

(56) References Cited

U.S. PATENT DOCUMENTS 4,380,477 A * 4/1983 Saunders .................. B24C 5/02
                                                                134/7
6,062,095 A * 5/2000 Mulrooney ............ G01D 11/24
                                                                73/204.22

(Continued)

*Primary Examiner* — Tung X Nguyen
*Assistant Examiner* — Dominic E Hawkins
(74) *Attorney, Agent, or Firm* — Wood, Phillips, Katz, Clark & Mortimer

(57) ABSTRACT

A measurement instrument comprises a housing including a measurement circuit for measuring a process variable. A primary element is adapted to extend into a process vessel. The primary element includes an elongate hollow sleeve open to an interior of the process vessel, in use. A process adapter operatively connects the housing to the primary element for securing the instrument to the process vessel. The process adapter comprises a through opening. A seal adapter is received in the process adapter through opening. The seal adapter comprises a central bore opening into the hollow sleeve. The process adapter comprises a flushing port in communication with the through opening and an annular space between the seal adapter and the process adapter intersecting the flushing port. The seal adapter comprises a plurality of jet passages aligned at the annular space and opening into the bore.

12 Claims, 4 Drawing Sheets

(51) Int. Cl.
*B08B 5/02* (2006.01)
*G01S 13/88* (2006.01)
*G01S 7/00* (2006.01)
*G01S 13/10* (2006.01)
*H02J 50/10* (2016.01)
*H02J 50/80* (2016.01)
*G01S 7/02* (2006.01)
*H01Q 13/02* (2006.01)

(56) References Cited

U.S. PATENT DOCUMENTS

| | | | |
|---|---|---|---|
| 7,255,002 B2 * | 8/2007 | Gravel | G01F 23/284 |
| | | | 73/290 R |
| 7,889,120 B2 | 2/2011 | Flasza | |
| 2003/0201842 A1 * | 10/2003 | Gard | G01F 23/268 |
| | | | 333/24 R |
| 2007/0008212 A1 * | 1/2007 | Serban | H01Q 13/02 |
| | | | 342/124 |
| 2014/0125512 A1 * | 5/2014 | Janitch | G01F 23/284 |
| | | | 342/124 |
| 2014/0340683 A1 | 11/2014 | Tosch et al. | |
| 2015/0122013 A1 * | 5/2015 | Lenk | G01F 23/284 |
| | | | 73/290 V |
| 2016/0233633 A1 * | 8/2016 | Janitch | H01R 25/00 |

* cited by examiner

THROUGH AIR RADAR LEVEL TRANSMITTER WITH FLUSHING PORT

CROSS-REFERENCE TO RELATED APPLICATIONS

This application claims priority of provisional application No. 62/449,657, filed Jan. 24, 2017.

FEDERALLY SPONSORED RESEARCH OR DEVELOPMENT

Not Applicable.

MICROFICHE/COPYRIGHT REFERENCE

Not Applicable.

FIELD

This invention relates to process control instruments and, more particularly, to a measurement instrument with a flushing port.

BACKGROUND

Process control systems require the accurate measurement of process variables. Typically, a sensor in the form of a primary element senses the value of a process variable and a transmitter develops an output having a value that varies as a function of the process variable. For example, a level transmitter includes a primary element for sensing level and a circuit for developing an electrical signal representing sensed level.

Knowledge of level in industrial process tanks or vessels has long been required for safe and cost-effective operation of plants. Many technologies exist for making level measurements. These include buoyancy, capacitance, ultrasonic and microwave radar, to name a few.

In one form, a through air measurement, such as ultrasonic or microwave radar, comprises an antenna, horn or the like which extends into the process vessel. The horn is hollow and exposed to the materials in the vessel. A seal is generally provided between the horn and the electric circuits.

In another form of level measurement, a guided wave radar transmitter uses a coaxial probe which functions as an electronic transmission line into the process vessel. The probe includes a hollow sleeve that extends into the process vessel. Similarly, a capacitance probe includes a hollow sleeve.

With these and other measurement instruments, the primary element may be adversely effected by process build-up. To clean the primary element, it may be necessary to remove the primary element from the process vessel. However, this may be undesirable if the vessel is closed and the primary element provides a process seal.

Thus, it is advantageous to provide a means for cleaning the primary element without removing the primary element from the process vessel. One known technique uses a port opening directly into the hollow interior of the primary element. However, this may not always be effective in removing contaminants.

The present invention is directed to solving one or more of the problems discussed above in a novel and simple manner.

SUMMARY

As described herein, a flushing port in a primary element creates a swirling action for flushing of contaminants.

There is disclosed in accordance with one aspect, a measurement instrument comprising a housing including a measurement circuit for measuring a process variable. A primary element is adapted to extend into a process vessel. The primary element includes an elongate hollow sleeve open to an interior of the process vessel, in use. A process adapter operatively connects the housing to the primary element for securing the instrument to the process vessel. The process adapter comprises a through opening. A seal adapter is received in the process adapter through opening. The seal adapter comprises a central bore opening into the hollow sleeve. The process adapter comprises a flushing port in communication with the through opening and an annular space between the seal adapter and the process adapter intersecting the flushing port. The seal adapter comprises a plurality of jet passages aligned at the annular space and opening into the bore.

In one aspect, the measurement instrument comprises a through air measurement instrument and the measurement element comprises an antenna.

In another aspect, the measurement element comprises a probe.

It is a feature that the seal adapter comprises a dielectric seal filling a part of the bore above the jet passages. The jet passages may open tangentially into the bore to create a swirling action proximate a lower end of the seal.

It is another feature that the seal adapter comprises three jet passages aligned with the annular space and opening into the bore. The jet passages may open tangentially into the bore.

There is disclosed in accordance with another aspect a through air measurement instrument comprising a housing including a measurement circuit having a launching element for generating or receiving a high frequency signal for measuring a process variable. An antenna is adapted to extend into a process vessel. The antenna comprises a horn open to an interior of the process vessel, in use. A process adapter operatively connects the housing to the antenna for securing the instrument to the process vessel. The process adapter comprises a through opening. A seal adapter is received in the process adapter through opening. The seal adapter comprises a central bore opening into the hollow sleeve. The process adapter comprises a flushing port in communication with the through opening and an annular space between the seal adapter and the process adapter intersecting the flushing port. The seal adapter comprises a plurality of jet passages aligned with the annular space and opening into the bore.

Other features and advantages will be apparent from a review of the entire specification, including the drawings and claims.

DETAILED DESCRIPTION

Figure 1:
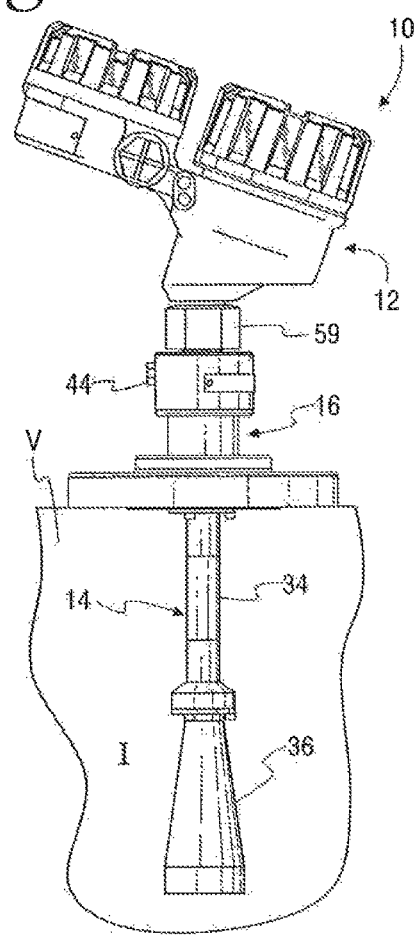
FIG. 1 is a side view of a through air measurement instrument including a flushing port in accordance with the invention.
Figure 2:
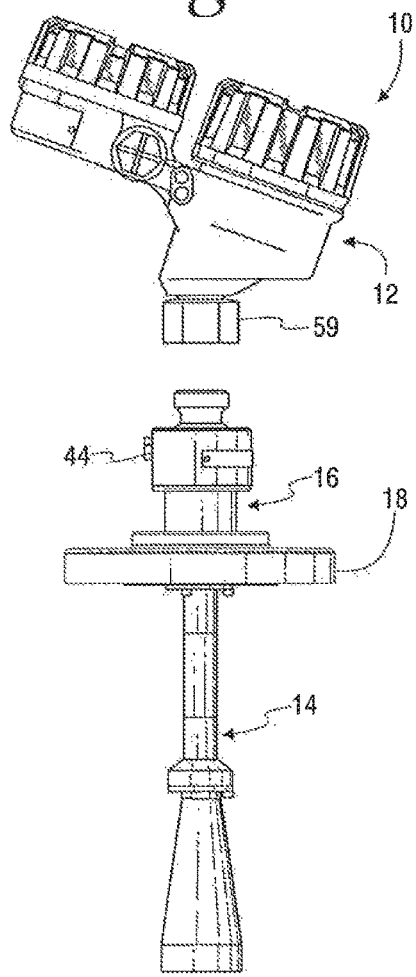
FIG. 2 is a side view, similar to FIG. 1, with a control housing separate from a primary element.

Referring to FIGS. 1 and 2, a process control instrument 10 according to the invention is illustrated. The process control instrument 10 uses micro power impulse radar (MIR) in conjunction with equivalent time sampling (ETS) and ultra-wideband (UWB) transceivers for measuring a level using time domain reflectometry (TDR). Particularly, the instrument 10 uses through air radar for sensing level. While the embodiments described herein relate to an MIR level sensing apparatus, various aspects of the invention may be used with other types of process control instruments for measuring various process parameters, such as a rangefinder, as will be apparent to those skilled in the art.

The process control instrument 10 includes a control housing 12 and a sensor or primary element 14. In the illustrated embodiment, the primary element 14 is an antenna. With alternative embodiments, the primary element 14 could be a probe.

The antenna 14 includes a process adapter 16 for connection to the housing 12. The process adapter 16 is mounted to a process vessel V, see FIG. 1, using a flange 18. The process adapter 16 may be threaded or welded to the flange 18. Alternatively, the process adapter 16 may be threaded directly into an opening in the process vessel V.

The instrument 10 uses pulse-burst radar technology with ETS circuitry. Short bursts of microwave energy are emitted and subsequently reflected from a surface. The distance is calculated by the equation $$D=(\text{velocity of EM propagation})*\text{transit time(round trip)}/2.$$

Level is then calculated by applying a tank height value. ETS is used to measure the high speed, low power electromagnetic (EM) energy. The high-speed EM energy (1,000 ft/µs) is difficult to measure over short distances and at the resolutions required in the process control industry. ETS captures the EM signals in real time (nanoseconds) and reconstructs them in equivalent time (milliseconds), which is much easier to measure. ETS is accomplished by scanning the vessel to collect thousands of samples. The round-trip event on a 65 ft. tank takes only 133 nanoseconds in real time. After it is reconstructed in equivalent time it measures 200 milliseconds.

The through air radar level measurement instrument 10 launches a radar signal which reflects off a liquid or other surface and measures time of flight between transmission and reception of the radar signal. Electrical energy is converted to an electromagnetic wave from the launching element which propagates through free space. The system operates a signal at 26 GHz.

Figure 3:
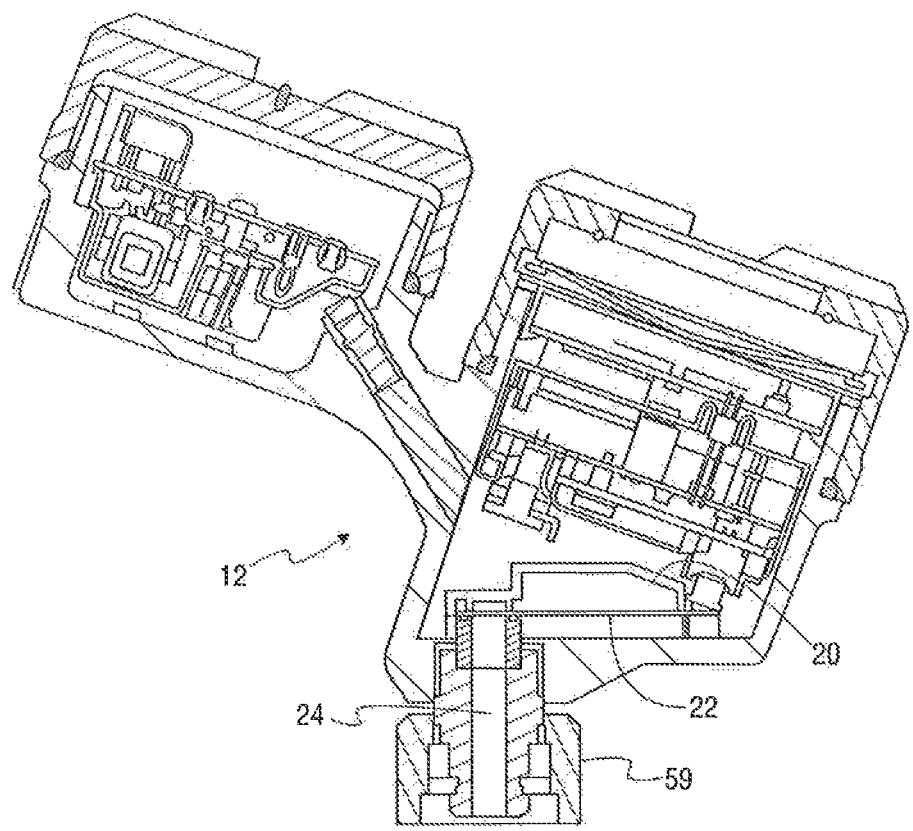
FIG. 3 is a side section view of the control housing.
Figure 4:
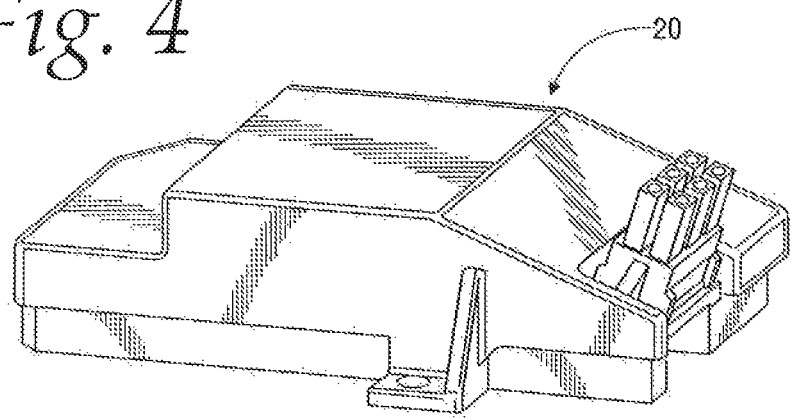
FIG. 4 is a perspective view of a radio frequency module in the control housing.

The control housing 12, see FIG. 3, includes an RF module 20 having a printed circuit board 22 with a launching element. In the illustrated embodiment, the launching element comprises electro-magnetic radiating elements which are traces designed on the circuit board 22. The launching element generates and receives a high frequency signal for measuring level.

An air-filled waveguide 24 is sealingly mounted to the control housing 12 and aligned with the launching element on the printed circuit board 22. Thus, the launching element works together with the waveguide 24 to generate the launching signal to the antenna 14, as is known.

Figure 5:
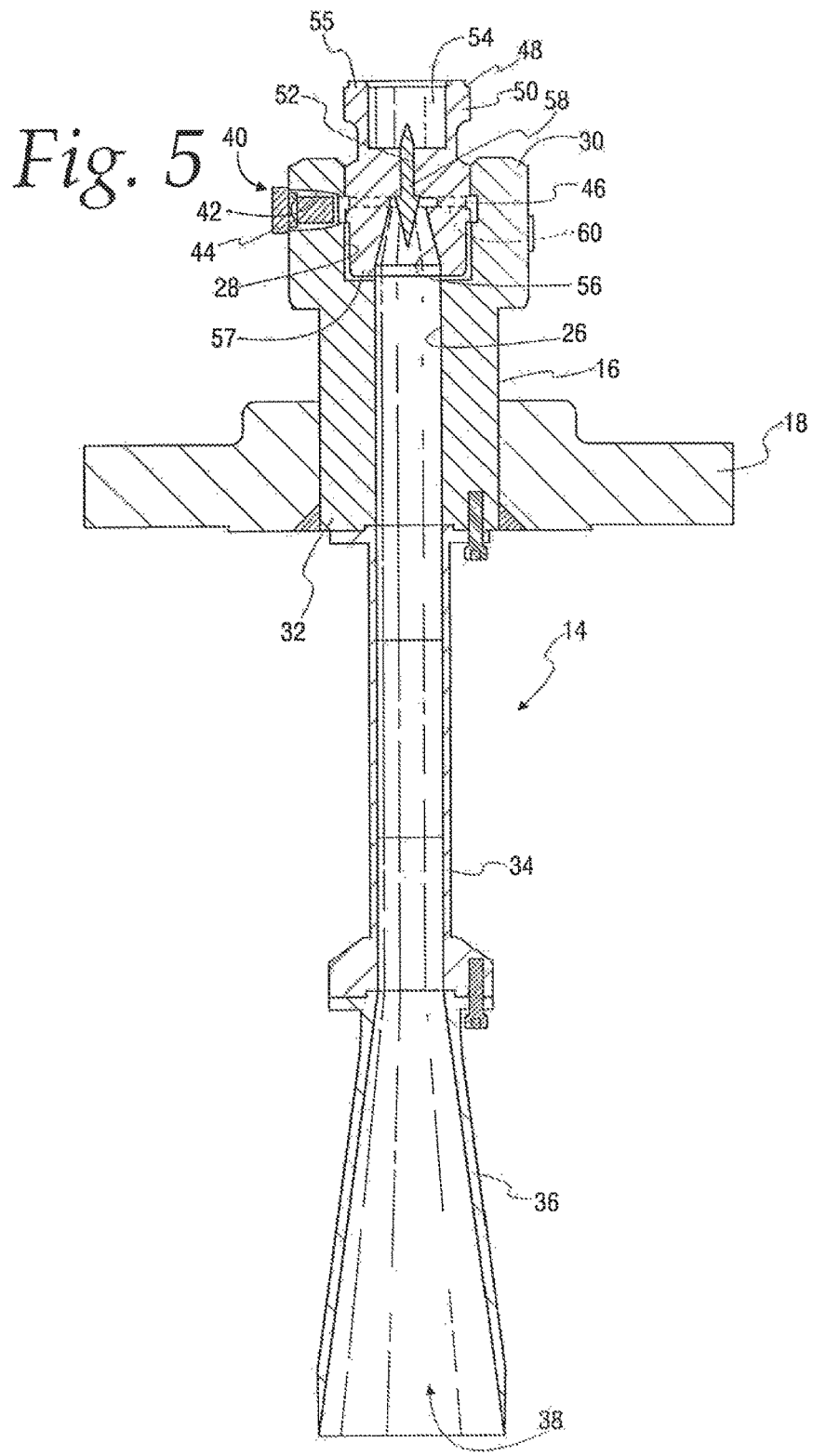
FIG. 5 is a sectional view of the primary element.

Referring to FIG. 5, the process adapter 16 is generally cylindrical and includes a cylindrical through opening 26. The through opening 26 includes a counterbore 28 at a near end 30. As used herein, the term "near" is used relative to elements toward the "top" in FIG. 5, and the term "distal" refers to elements toward the bottom in FIG. 5. The process adapter 16 has a distal end 32 selectively received in the flange 18 and may be welded or threaded thereto. Alternatively, the process adapter distal end 32 may be threaded for mounting directly to a process vessel, as necessary or desired.

The antenna 14 comprises a horn extension 34 mounted to the process adapter 16 at one end and an opposite end connected to an antenna horn 36. The process adapter through opening 26, horn extension 34 and antenna horn 36 provide a continuous hollow space 38 open to an interior I of the process vessel V, see FIG. 1, in use.

The process adapter 16 include a flushing port 40 comprising a side wall through opening 42, selectively closed by a plug 44, opening into the counter bore 28. The counter bore 28 includes an annular space 46 defined by a groove machined in the counter bore 28 and axially aligned with the flushing port opening 42.

A seal adapter 48 comprises a generally cylindrical body 50. The seal adapter 48 includes a through opening 52 aligned with a first counter bore 54 at a near end 55. The through opening 52 includes a widening portion 56 at a distal end 57 to a width corresponding to the process adapter through opening 26. The distal end 57 is threadably received in the process adapter counter bore 28. The near end 55 is configured as a quick connect coupler for mating with a corresponding coupler 59 on the control housing, see FIG. 3

A seal 58 is received in the seal adapter through opening 52. The seal 58 may comprise a quartz seal brazed to the through opening 52 or a PTFE seal secured by an adhesive and sealed with O rings, as necessary or desired. The seal 58 is a dielectric material which provides a transition from the waveguide 24 to the antenna 14. The seal 58 has pointed ends for impedance matching. The seal 58 also acts as a mechanical barrier which isolates the waveguide 24 and housing 12 from the process vessel.

The annular space 46 is at the interface between the seal adapter 48 and the process adapter 16. As will be appreciated, the annular space 46 could be machined in the process adapter 16, the seal adapter 48 or a combination of both the seal adapter 48 and the process adapter 16, as desired.

Figure 6:
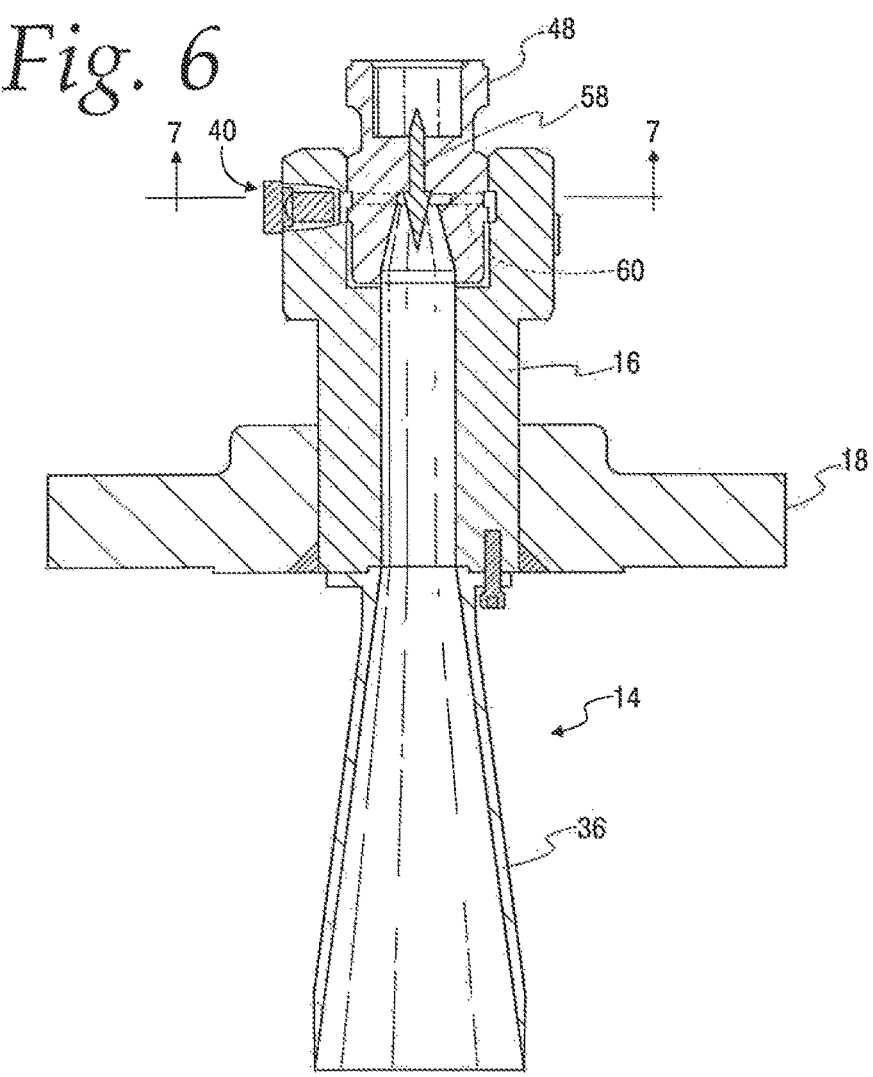
FIG. 6 is a sectional view, similar to FIG. 5, with a horn extension eliminated.

FIG. 6 is similar to FIG. 5, except that the horn extension 34 is omitted and the antenna horn 36 is connected directly to the process adapter distal end 32.

Figure 7:
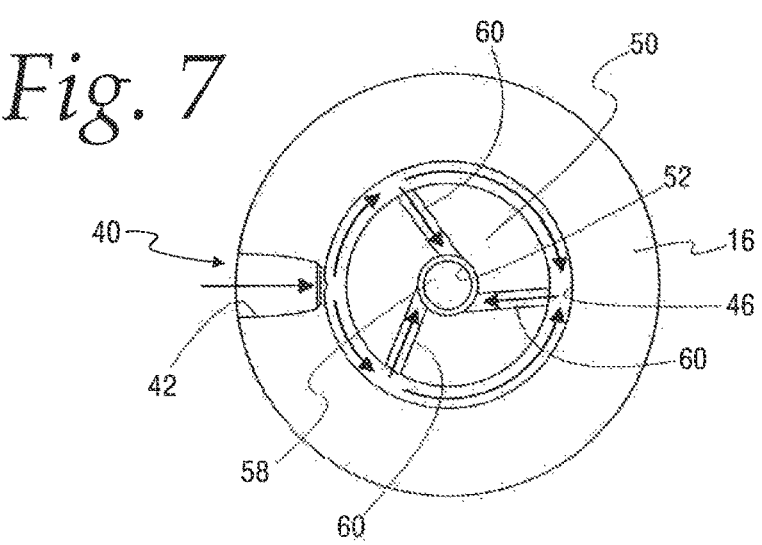
FIG. 7 is a cross-sectional view illustrating the flushing port.

As shown in FIG. 7, the seal adapter body 50 includes three jet passages 60 from an outer wall of the body 50 into the through bore widening part 56 where the seal 58 begins to narrow. The jet passages 60 open tangentially into the through opening 56. The jet passages 60 are axially aligned with the annular space 46 at the interface of the process adapter 16 and the seal adapter 48.

As described, the flushing port 40 uses a system of jet passages 60 to create a swirling action in the area of the seal 58. The annular space 46 provides an annular channel which distributes the flow of a cleaning product, such as water, detergent, solution or air, to the three jet passages 60. By having the jet passages 60 open tangentially into the through opening 56, this creates a swirling action in the area of the seal. The flow paths are illustrated by arrows in FIG. 7. Dry air can also be used to avert condensation build-up.

Thus, if there is a build-up of contaminants in the instrument, the flushing port 40 can be used to clean the antenna 14.

While three jet passages 60 are shown, the seal adapter would generally include two or more such channels that form jets extending from the outer wall to a central bore, positioned at the lower end of the seal. The channels enter the central bore tangentially. The channels are thus open to and provide a flow path from the annulus to the horn antenna.

As will be apparent, the flushing port described herein can be used with other designs for a through air measurement instrument, including ultrasonic and the like. Likewise, the flushing port can be used with any technology that is adversely effected by process build-up. For example, a guided wave radar instrument includes a probe having a hollow sleeve as shown in my U.S. Pat. No. 9,217,659, the specification of which is incorporated by reference herein. The described flushing port could be used with such a probe. Similarly, capacitance probes include hollow sleeves.

Thus, the invention is generally applicable to process control instruments including a primary element adapted to extend into a process vessel including an elongate hollow sleeve open to an interior of the process vessel.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A measurement instrument comprising:
   a housing including a measurement circuit for measuring a process variable;
   a primary element adapted to extend into a process vessel, the primary element including an elongate hollow sleeve open to an interior of the process vessel, in use;
   a process adapter operatively connecting the housing to the measurement element for securing the instrument to the process vessel, the process adapter comprising a through opening; and
   a seal adapter received in the process adapter through opening, the seal adapter comprising a central bore opening into the hollow sleeve;
   wherein the process adapter comprises a flushing port in communication with the through opening and an annular space between the seal adapter and the process adapter intersecting the flushing port, and the seal adapter comprises a plurality of jet passages aligned with the annular space and opening into the bore.

2. The measurement instrument of claim 1, wherein the measurement instrument comprises a through air measurement instrument and the measurement element comprises an antenna.

3. The measurement instrument of claim 1, wherein the measurement element comprises a probe.

4. The measurement instrument of claim 1, Wherein the seal adapter comprises a dielectric seal filling a part of the bore above the jet passages.

5. The measurement instrument of claim 4 wherein the jet passages open tangentially into the bore to create a swirling action proximate a lower end of the seal.

6. The measurement instrument of claim 1, wherein the seal adapter comprises three jet passages aligned with the annular space and opening into the bore.

7. The measurement instrument of claim 6 wherein the jet passages open tangentially into the bore.

8. A through air measurement instrument comprising:
   a housing including a measurement circuit having a launching element for generating or receiving a high frequency signal for measuring a process variable;
   an antenna adapted to extend into a process vessel, the antenna comprising a horn open to an interior of the process vessel, in use;
   a process adapter operatively connecting the housing to the antenna for securing the instrument to the process vessel, the process adapter comprising a through opening; and
   a seal adapter received in the process adapter through opening, the seal adapter comprising a central bore opening into the horn;
   wherein the process adapter comprises a flushing port in communication with the through opening and an annular space between the seal adapter and the process adapter intersecting the flushing port, and the seal adapter comprises a plurality of jet passages aligned with the annular space and opening into the bore.

9. The through air measurement instrument of claim 8 wherein the seal adapter comprises a dielectric seal filling a part of the bore above the jet passages.

10. The through air measurement instrument of claim 9 wherein the jet passages open tangentially into the bore to create a swirling action proximate a lower end of the seal.

11. The through air measurement instrument of claim 8 wherein the seal adapter comprises three jet passages aligned with the annular space and opening into the bore.

12. The through air measurement instrument of claim 11 wherein the jet passages open tangentially into the bore.

* * * * *

UNITED STATES PATENT AND TRADEMARK OFFICE
CERTIFICATE OF CORRECTION

| | | |
|---|---|---|
| PATENT NO. | : 10,451,468 B2 | Page 1 of 1 |
| APPLICATION NO. | : 15/676344 | |
| DATED | : October 22, 2019 | |
| INVENTOR(S) | : Paul G. Janitch | |

It is certified that error appears in the above-identified patent and that said Letters Patent is hereby corrected as shown below:

On the Title Page

Item (60), should read:
(60) Provisional application No. 62/449,657, filed on Jan. 24, 2017.

Signed and Sealed this
Twenty-first Day of January, 2020

Andrei Iancu
*Director of the United States Patent and Trademark Office*